United States Patent [19]
Helders

[11] Patent Number: 5,734,986
[45] Date of Patent: Mar. 31, 1998

[54] SETTING UP A CONNECTION IN A COMMUNICATION SYSTEM

[75] Inventor: Jan Helders, Järfälla, Sweden

[73] Assignee: Telefonaktiebolaget LM Ericsson, Stockholm, Sweden

[21] Appl. No.: 807,687

[22] Filed: Feb. 28, 1997

[30] Foreign Application Priority Data

Feb. 29, 1996 [SE] Sweden ................... 9600798

[51] Int. Cl.$^6$ ................................... H04B 1/00
[52] U.S. Cl. ................. 455/525; 455/422; 455/517; 455/62; 455/455; 455/67.1; 455/502; 375/202; 375/356; 370/503
[58] Field of Search ................. 455/422, 434, 455/455, 464, 502, 517, 524, 525, 67.1, 67.6, 67.7, 226.1, 226.2, 62, 436, 437, 443, 450; 375/202, 203, 356; 370/503, 508, 252

[56] References Cited

U.S. PATENT DOCUMENTS

| 5,396,648 | 3/1995 | Patsiokas et al. | |
| 5,448,593 | 9/1995 | Hill | 455/226.1 |
| 5,455,965 | 10/1995 | Shaughnessy et al. | 455/67.6 |
| 5,475,868 | 12/1995 | Duque-Anton et al. | 455/67.1 |

FOREIGN PATENT DOCUMENTS

WO94/22240  9/1994  WIPO .

OTHER PUBLICATIONS

International-Type Search Report re SE 96/00215 Date of Mailing of report: Nov. 15, 1996.

*Primary Examiner*—Reinhard J. Eisenzopf
*Assistant Examiner*—Doris To
*Attorney, Agent, or Firm*—Burns, Doane, Swecker & Mathis, L.L.P.

[57] ABSTRACT

The present invention relates to a method and to an arrangement for automatically connecting a mobile station (A1) in a radio network (RN11) desiring to setup a connection with a subscriber (B1) with an available RAP station (RAP1) which provides the best connection of the RAP stations (RAP1, RAP2, RAP3, RAP4, RAP5) that surround the mobile station (A1). The mobile station (A1) sends a call setup message (CSM) which is received by the surrounding available RAP stations (RAP1, RAP2, RAP3, RAP4). The RAP stations calculate the quality of the received call setup message (CSM) and obtain a signal delay ($\Delta T$) on the basis of the calculated message quality value. The RAP stations wait until the signal delay ($\Delta T$) expires before sending a response signal or call acknowledge message (CAM) to the mobile station (A1). The mobile station (A1) receives the first obtained response signal (CAM) and in response thereto switches to a call direction change mode (CDC) which prevents the mobile station (A1) from receiving more signals. The mobile station (A1) then sends a select message (SELM) to the RAP station from which it received the first response signal (CAM). The selected RAP station continues with setting up the subscriber connection.

23 Claims, 4 Drawing Sheets

SETTING UP A CONNECTION IN A COMMUNICATION SYSTEM

FIELD OF INVENTION

The present invention relates to a method and to an apparatus for connecting one subscriber in a radio network to another subscriber via one of several available radio access points (RAP stations).

DESCRIPTION OF THE PRIOR ART

Synchronized and frequency hopping radio networks are generally known in the art. Synchronization means that all radio stations in the radio network will be aware of the so-called network time to a certain degree of accuracy at each moment in time. Synchronized frequency hopping means that all radio stations in the network hop in synchronism between different frequencies in a (frequency) hop sequence (NHF), which is common to all radio stations in the radio network. The hop sequence is a sequency of frequencies that can be generated pseudo-randomly as a function of the so-called network parameters. A network parameter may be a cryptokey that is known only to the radio stations included in the radio network.

The time at which frequency hopping shall take place is controlled by a respective clock in each of the radio stations. Consequently, it is extremely important that the clocks in respective radio stations are synchronized with one another, i.e. that they are aware of the network time, in order to achieve good synchronization.

The radio stations may become out of synchronization with one another as a result of long pauses in transmission. To avoid this and in order to re-synchronize the radio stations with one another, the relevant network time can be included at the end of each message transmitted between two radio stations. In the absence of this updating, the radio stations would lose synchronization sooner or later and therewith be forced to make a separate call asking for synchronization to be restored. This separate call is poorly protected against disturbance and interference. The messages and signals transmitted between two radio stations are encoded and encrypted on the hop sequence.

A radio station that is not involved in a connection setup is in an idle mode or, otherwise expressed, in a rest state, meaning that the radio station is prepared to receive new incoming calls concerning a connection setup. When in its idle mode, the radio station does not listen to each frequency hop in the hop sequence, but only to each nth hop. There is obtained in this way an idle cycle which comprises the number of frequency hops $N_{idle}$ which pass unheard by the radio station before the radio station again listens to the frequency concerned in the hop sequence. A typical value of $N_{idle}$ may be thirty-two hops, meaning that a radio station which is in an idle mode will listen to only each thirty-second frequency hop in the hop sequence. A lower value of $N_{idle}$ will give a shorter call time at the cost of a shorter maximum time in which the radio stations may be in an idle mode before they become out of synchronization with one another.

Because the clocks in the radio stations may become unsynchronized with one another as before mentioned, it is necessary for the radio stations to be able to handle a given maximum clock offset with respect to a number of hops. This maximum clock offset can be designated $N_{offset}$. In order to be able to receive a signal that is transmitted from a radio station that has a clock offset, the receiving radio station listens in its idle mode to the number of $N_{offset}$ hops in the hop sequence before and after the frequency hop that the radio station shall actually listen to in accordance with its idle cycle. This means that when in its idle mode, the receiving radio station will listen to that frequency which will apply at a time T already at the time $T-N_{offset}$ and will continue to listen in on the frequency until the time $T+N_{offset}$.

The signal can then be received in the receiving radio station when the signal has been sent with a clock offset that is smaller than or equal to $N_{offset}$ hops. Thus, if it is assumed that $N_{offset}$ is equal to twelve hops, a receiving radio station that is in an idle mode is able to receive a signal that has been sent twelve hops before or twelve hops after that hop to which the radio station shall actually listen in accordance with its idle cycle.

A radio station that is involved in a call setup will be in its normal mode, or expressed otherwise in a normal state, meaning that the radio station will utilize each frequency hop in the hop sequence while transmitting and receiving throughout the call setup.

The radio communication is uni-directional between a transmitting radio station and one or more receiving radio stations, and the call direction will therewith be changed when the transmitting radio station becomes a receiving radio, and vice versa.

When changing the call direction of a connection that has already been established, from a transmitting to a receiving radio station and vice versa, there will be a delay of 0.5–1 second before this switch has been made and communication can be continued on this connection. This is because the radio stations listen to a number of hops ($N_{offset}$ hops) before and after that frequency hop to which the radio station shall actually listen according to its idle cycle, as described above. In order to avoid this delay in the event of a change in the call direction, both radio stations can automatically switch to a call direction change (CDC-mode) when changing the call direction. The radio stations are in the CDC-mode for a certain time period, $T_{CDC}$ seconds. The radio stations are synchronized with one another during an ongoing call, when the messages are transmitted on each frequency in the hop sequence, wherein the radio stations are synchronized with one another before entering the CDC-mode. The radio stations in the CDC-mode need therefore only listen to a hop before and after the frequency hop in the hop sequence that the radio station shall actually listen to in accordance with its idle cycle, and the change of call direction in the CDC-mode can therefore be made more quickly. A message transmitted during the CDC-mode can only be received by those radio stations that are also situated in a corresponding CDC-mode and that have a clock which is synchronized with the transmitter within one hop. A receiver in the CDC-mode cannot receive the message from a transmitter that has a clock offset greater than one hop.

A radio network of the aforesaid kind can be connected to one or more permanent networks, such as public switched telephone networks or military telephone networks, via separate radio stations that can be designated radio access points (RAP stations). The setup of a connection from a mobile station in a radio network to a subscriber in a permanent network, and vice versa, is thus effected via the RAP station. The RAP station is connected to the permanent network via one or more switching centres or exchanges and therewith forms an interface between mobile and permanent networks.

A radio network may extend over a large area and therefore include, among other things, several RAP stations so as to obtain good coverage over the whole of the area. A plurality of RAP stations that cover one and the same area, either completely or partially, also provide better access capacity between the radio network and the permanent network. The RAP stations may be mobile, therewith enabling the area covered by the radio network to be changed.

According to earlier known techniques, a subscriber manually tests which RAP station of several available RAP stations will provide the best connection when setting up a connection via a RAP station. This is accomplished by manually calling each of the RAP stations one after the other with the aid of the identity number of respective stations. The calling subscriber then determines which RAP station will provide the best connection and chooses this station for setting up the connection desired.

The U.S. patent document, U.S. Pat. No. 5,396,648, describes a method in which a calling mobile station sends a call setup message to several base stations. Each of these base stations determines the signal quality of the received call setup message and compares this quality with a threshold value. When the signal quality lies above the threshold value, the base station establishes a communications connection with the calling mobile station. Otherwise, the base station enters a delay loop for a maximum given time delay which is inversely proportional to the measured signal quality of the call setup message received from the mobile station. This enables other base stations to setup a better connection with the mobile station whenever possible. If the mobile station establishes a connection with another base station, the base station leaves the delay loop and returns to its original state in which it can receive other call setup messages. Expiry of the time delay results in the base station storing the mobile station identity number included in the call setup message, wherewith the base station then returns to its original state for receiving call setup messages. If the same mobile station sends yet another setup message, the base station will establish a connection with the mobile station even when the measured signal value is below the threshold value, provided that no other base station has already setup the connection.

One drawback with this method is that several base stations that have measured a received setup message whose value exceeds the threshold value can setup a connection with the calling mobile station at one and the same time, therewith resulting in collision.

Patent document WO-A-94/22240 describes a mobile unit that stores and measures signals received from surrounding base stations corresponding to a call setup message. The mobile unit sends wait-signals to the base stations with the intention of delaying the setup of a connection while it chooses the base station that has the highest signal strength of those measured.

A connection is then setup between the best base station and the mobile unit. Thus, the mobile unit may first collect information from the surrounding base stations before setting up the desired connection.

SUMMARY OF THE INVENTION

One problem resolved by the invention is that concerning how a connection can be setup automatically between a mobile station and a called B-subscriber via one of several available RAP stations.

Another problem is how the best RAP station is obtained in setting up a connection, so that the obtained RAP station will provide the best connection.

Another problem is how a connection can be setup via a best RAP station without using a central control station that is in contact with all RAP stations.

Another problem resides in avoiding interference between signals that are transmitted simultaneously from several available RAP stations.

Thus, the object of the invention is to setup a desired connection in a communications network that includes at least one radio network and at least one permanent network. The connection is setup between a mobile station and a B-subscriber in a manner such that the connection setup will be effected automatically and via the RAP station that provides the best radio communication without using a central control station that has contact with all RAP stations.

This is achieved in accordance with the invention by delaying signals prior to their transmission and also by placing the radio stations in mutually different modes or states. These modes may be either idle modes, normal modes or CDC-modes, which have been described in the foregoing. RAP stations that have received a call setup message from a mobile station will calculate a quality value on respective connections. This quality value is used to calculate a signal delay which is used to delay a response signal or call acknowledge message sent to the mobile station susequent to the signal delay. Subsequent to the mobile station having received the first obtained response signal, the mobile station is blocked against further receipt of later transmitted response signals for a given period of time $T_{CDC}$.

More specifically, a mobile station that wishes to setup a connection with a B-subscriber transmits a connection setup message that is received by surrounding available RAP stations. The RAP stations calculate the quality of the incoming call setup message and, on the basis of the calculated quality value, obtain a respective signal delay and wait until the delay has expired before sending a response message.

A best RAP station can be considered to be that RAP station which provides the best radio connection with the mobile station when the mobile station wishes to setup the connection with the B-subscriber. The designation "best RAP station" includes the best speech quality or discernibility that can be achieved, or result in the least interference and disturbance on the radio connection. Another parameter may be that the C/I ratio (carrier wave/interference ratio) shall be the best possible or that the RAP station is situated in the vicinity of the mobile station.

The signal delay may include, on the one hand, a time delay on a number of full idle cycles and, on the other hand, a random clock offset $N_{camoffset}$ on a number of clock hops of the respective RAP stations. The time delay is inversely proportional to the calculated value of the signal quality, i.e. a good signal quality value will give a short time delay and vice versa. The RAP stations await the signal delay, i.e. the time delay and the clock offset $N_{camoffset}$, before sending a response message, CAM (Call Acknowledge Message). The RAP station that has obtained the best signal quality on the call setup message will transmit its CAM-signal within the shortest time from receiving the call setup message. The mobile station receives the first obtained CAM-signal and then switches to a CDC state for a given time period $T_{CDC}$, thereby preventing the mobile station from receiving other signals. The mobile station then sends a call setup request or select message SELM to the RAP station from which the CAM-signal was received. The selected RAP station continues with setting up the connection to the B-subscriber.

One advantage afforded by the invention is that a desired connection between a mobile station and a B-subscriber is setup automatically via the RAP station that provides the best connection, by virtue of the CAM-signals sent from the various RAP stations being delayed for a given number of full cycles, this number depending on how well the RAP stations have calculated the signal quality.

Another advantage is that the best RAP station is selected without using a central control station that has contact with all RAP stations.

This automatic call setup means that connection of the mobile station with the best RAP station will be effected without needing to engage the Operator.

Another advantage is that there is very little risk of interference occurring between several CAM-signals in the mobile station when several RAP stations have calculated the same value of the CAM-signal delay, since the clocks of respective RAP stations have been offset randomly $N_{camoffset}$ hops prior to transmission of the CAM-signal. A mobile station will only receive the first obtained CAM-signal and setup its desired connection via a corresponding RAP station, since the mobile station will switch to a CDC state after the first received CAM-signal and therewith will no longer be available to receive more signals during the time $T_{CDC}$ seconds.

Another advantage afforded by the invention is that several parameters can be used in calculating the quality of the call setup message in the RAP stations, as distinct from earlier known techniques. For instance, signal quality can be calculated by measuring the average strength of the received setup message or by determining the average interference on the received setup message. Another parameter that may be used in calculating signal quality may be the number of bits that cannot be retained when decoding the information in the setup message. This number can be determined by using the bit error rate (BER).

The invention will now be described in more detail with reference to preferred exemplifying embodiments thereof and also with reference to the accompanying drawings.

DESCRIPTION OF PREFERRED
EMBODIMENTS

Figure 1A:
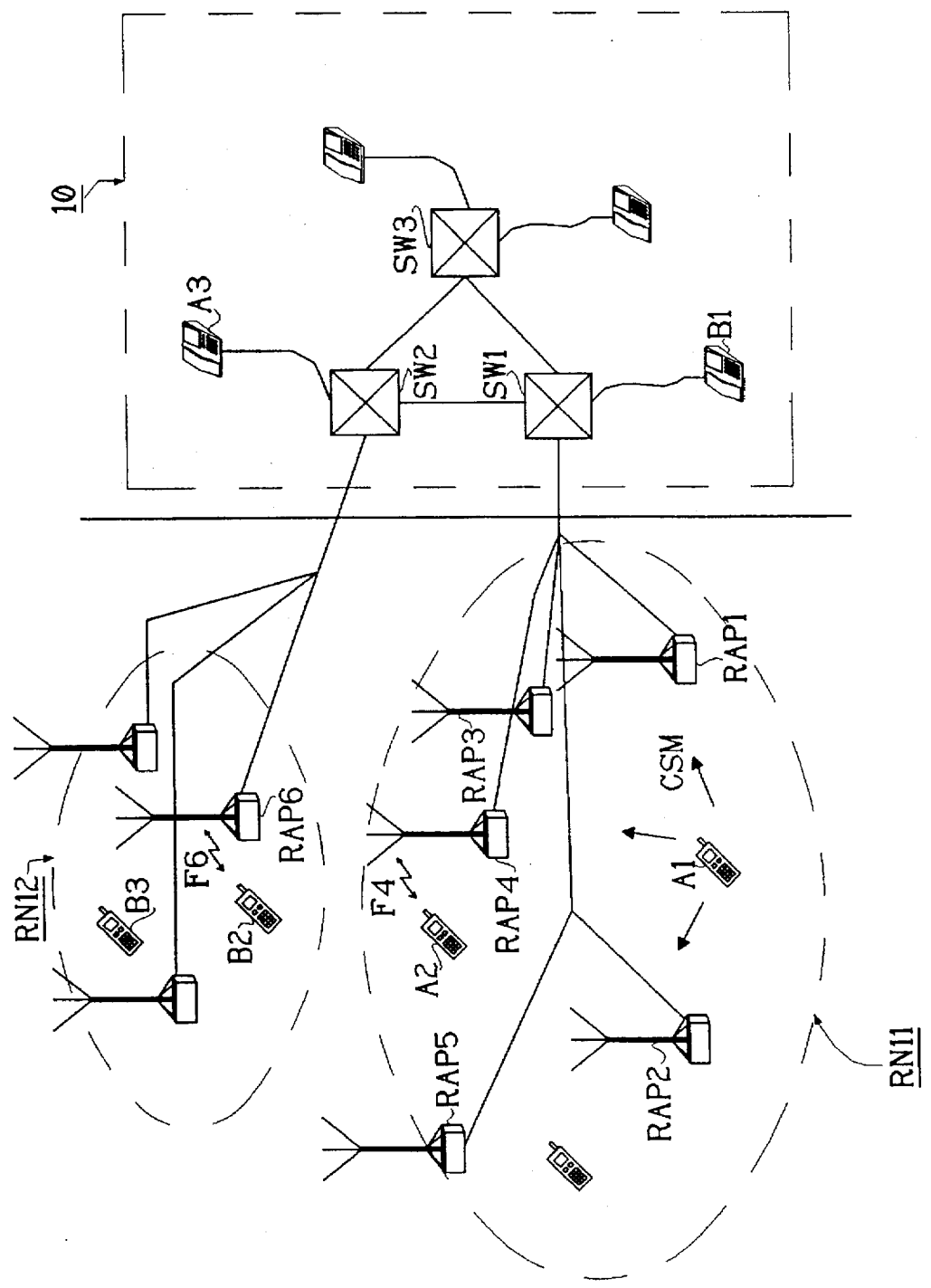
FIG. 1a is a schematic illustration of an inventive communications network that includes two radio networks and a permanent network.

FIG. 1a illustrates the construction of a communications network that includes one or more radio networks, such as for instance a first radio network RN11 and a second radio network RN12, and a permanent network 10.

The radio network RN11 includes several mobile stations, thereamong the mobile stations A1 and A2, and several RAP stations, thereamong the RAP stations RAP1, RAP2, RAP3, RAP4 and RAP5, which form an interface against the permanent network 10, via a switching centre or exchange SW1, as described above.

Several mobile stations are found within the radio network RN12, thereamong the mobile stations B2 and B3, and several RAP stations, including the RAP station RAP6, which form interfaces against the permanent network 10, via a switching centre or exchange SW2.

Several permanent subscribers are connected to the permanent network 10 through the switching centres SW1, SW2 and a switching centre SW3. The switching centres SW1-SW3 are mutually connected in turn. The Figure shows the permanent subscribers B1 and A3 which are connected to the switching centre SW1 and SW2 respectively.

There will now be described an exemplifying embodiment in which the mobile station A1 wishes to setup a call connection with the permanent subscriber B1 in FIG. 1a. The mobile station A1 wishes to be connected automatically via the best available RAP station.

The connection desired by the mobile station A1 is setup on a hop sequence in accordance with the known technique described above.

As described in the foregoing, the best RAP station can be considered to be the RAP station that provides the best radio connection with the mobile station A1. The designation "best RAP station" includes the best speech quality or the best discernibility that can be achieved, or the least interference in communication on the radio connection. Another parameter may be that the C/I ratio (carrier wave/ interference ratio) shall be the best possible or that the RAP station is situated in the vicinity of the mobile station A1.

In an initial state, i.e. prior to the mobile station A1 having commenced a connection setup with the subscriber B1, the mobile station A1 and the RAP stations, RAP1, RAP2, RAP3 and RAP5, are in the idle mode, I. In the initial stage, it is also assumed that the mobile station A2 communicates with the mobile station B2. This is achieved by virtue of the mobile station A2 being setup in a radio connection F4 between the mobile station A2 and the RAP station RAP4 by virtue of the RAP station RAP4 being connected to the switching centre SW1, which is, in turn, in contact with the switching centre SW2, by virtue of the switching centre SW2 being connected to the RAP station RAP6, and by virtue of the RAP station RAP6 being, in turn, setup in a radio connection F6 with the mobile station B2.

When the calling mobile station A1 wishes to setup the connection with the permanent subscriber B1, the mobile station sends a call setup message CSM to surrounding available RAP stations that lie within the range of the mobile station A1 and which are not already occupied by a connection with another mobile station. As before mentioned, the call setup message is transmitted encoded and encrypted on the hop sequence. Although not necessary, the call setup message may include the subscriber number (B1 number) of the subscriber B1, among other things. The mobile station A1 then switches to its original idle mode, I, in order to be able to receive a call acknowledge message CAM, also called response message A response message will be sent from all RAP stations that have received a CAM-signal. This will be explained in more detail below. If the mobile station A1 does not receive a response message from any RAP station within a given waiting period, CAM-wait time, the attempt made by the mobile station A1 to establish a call setup is aborted and the mobile station A1 sends a new CSM-signal. Alternatively, this transmission of a new CSM-signal can be assigned to the Operator of the mobile station A1.

It is assumed in FIG. 1a that the RAP stations RAP1, RAP2 and RAP3 will receive the CSM-signal sent from the mobile station A1. It is also assumed that the RAP station RAP5 is too far away from the mobile station A1 and that the RAP station RAP4 is occupied in a radio connection F4 with the mobile station A2. When the RAP stations RAP1, RAP2 and RAP3 receive the CSM-signal, these stations return to the idle mode I.

According to the illustrated embodiment, the RAP stations RAP1, RAP2 and RAP3 determine the quality of the received CSM-signal. The value of signal quality can be calculated, for instance, by determining the average strength of the received CSM-signal or by determining the average interference on the received CSM-signal. Another parameter that can be used when calculating signal quality is the number of bits that cannot be retained when decoding the information in the CSM-signal, which can be achieved with the bit error rate, BER.

The RAP stations RAP1, RAP2 and RAP3 calculate on the basis of the calculated signal quality value a CAM-signal delay, $\Delta T$, which may include a time delay $T_{del}$ and also a clock offset $N_{camoffset}$. The time delay $T_{del}$ will preferably include a full number of hop sequence idle cycles and the clock offset $N_{offset}$ will preferably include a clock offset on a number of hops.

Thus, the CAM-signal delay $\Delta T$ is the delay with which the RAP stations RAP1, RAP2 and RAP3 send the CAM-signal to the mobile station A1. The manner in which the CAM-signal delay $\Delta T$ is calculated will be explained in more detail below.

The RAP station RAP1 calculates, e.g. a CAM-signal delay $\Delta T1$, the RAP station RAP2 calculates a CAM-signal delay $\Delta T2$ and the RAP station RAP3 calculates a CAM-signal delay $\Delta T3$, it being assumed that $\Delta T1 < \Delta T2 < \Delta T3$.

Thus, the RAP stations RAP1, RAP2 and RAP3 then send, in turn, the response message, CAM-signal, to the mobile station A1, since it has been assumed in the foregoing that $\Delta T1 < \Delta T2 < \Delta T3$. The CAM-signal is sent on the hop sequence and includes the identity number (RAP-id) of the RAP station, among other things. In the illustrated case, the RAP station RAP1 will be the RAP station that first sent a CAM-signal to the mobile station A1.

Subsequent to the RAP stations RAP1, RAP2 and RAP3 having each sent its respective CAM-signal, the stations switch to their mutually different call direction change modes (CDC-modes) for a given waiting period, $T_{selm}$ seconds. The value of the wait time $T_{selm}$ is greater than the process time t1 corresponding to the maximum time taken for the mobile station A1 to process and treat a signal from the time of receiving the signal.

The mobile station A1 receives the first transmitted CAM-signal and in response thereto switches to the same CDC-mode as the CDC-mode of the RAP station that sent the received CAM-signal.

In the illustrated case, the mobile station A1 receives the CAM-signal from the RAP station RAP1. As described above, the mobile station A1 is unable to receive other transmitted signals when in its CDC-mode, and the later transmitted CAM-signals from the RAP stations RAP2 and RAP3 cannot be received by the mobile station A1.

The mobile station A1 then sends a call setup request or select message SELM in its CDC-mode. The select message SELM includes the B1 number and the identity number (RAP1-id) of the RAP station RAP1, among other things.

The RAP station RAP1 receives the select message sent from the mobile station A1 and identifies its identity number RAP1-id in the select message SELM, wherein the RAP station RAP1 is connected to the switching centre SW1 in the permanent network 10 and then to the subscriber B1 in a known manner.

The RAP stations RAP2 and RAP3, which have been assumed to have sent their respective response messages or call acknowledge messages CAM at a later time than the RAP station RAP1, receive no SELM-signal from the mobile station A1. When the wait time $T_{selm}$ seconds has lapsed, these mobile stations return to their original idle mode I. They are therewith able to receive CAM-signals and are thus available for other desired connection set-ups.

Figure 1B:
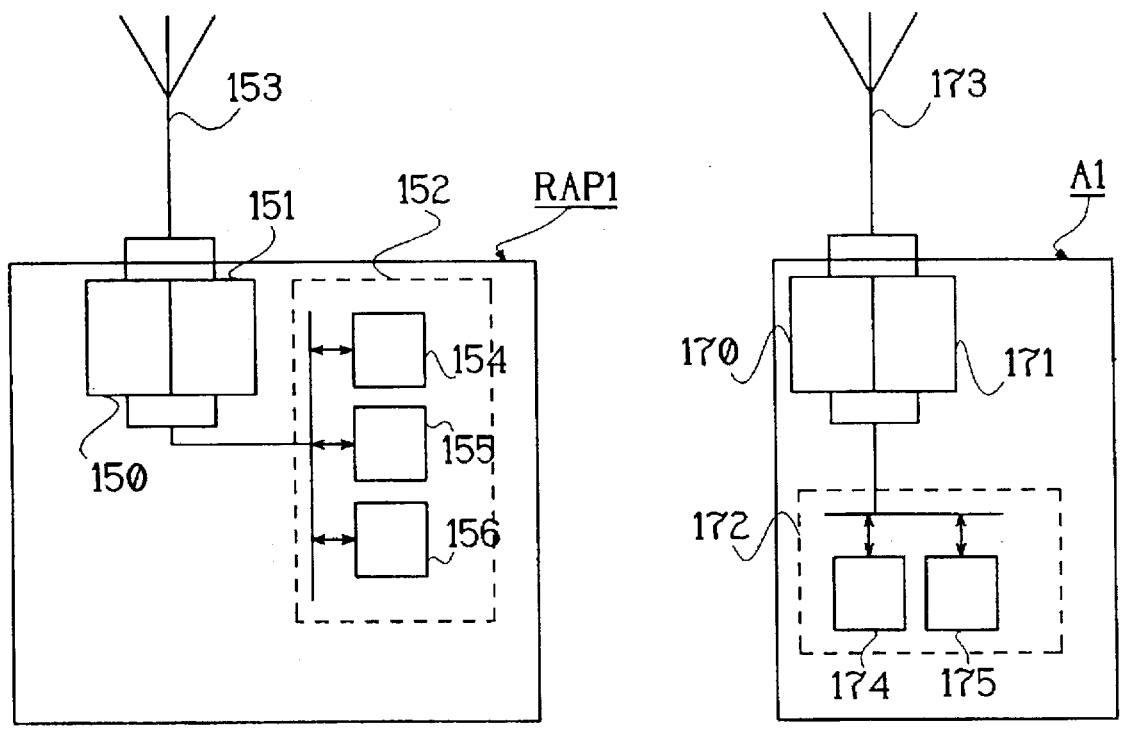
FIG. 1b is a schematic block diagram illustrating a RAP station and a mobile station A1 in accordance with the invention.

FIG. 1b is a schematic block diagram illustrating the RAP station RAP1 and the mobile station A1 described in the above example. The RAP station RAP1 includes a transmitter 150, a receiver 151 and a control means 152. The transmitter 150 and the receiver 151 are connected to an antenna 153 and to the control means 152.

The mobile station A1 includes a transmitter 170, a receiver 171 and a processor means 172. The transmitter 170 and the receiver 171 are connected to an antenna 173 and to the processor means 172.

The control means 152 includes functional means for implementing the inventive method, such as means 154 for calculating a response signal delay $\Delta T$; an identification means 155, and a clock 156 which keeps check on the time, these functional means being those shown in the Figure. The functional means 154, 155, 156 communicate with one another via a bus connected to the transmitter 150 and the receiver 151.

The control means 152 controls the included functional means 154, 155, 156 via the bus, and causes said means to carry out desired operations in accordance with the method.

The means 154 that calculate the response signal delay $\Delta T$ is used to calculate a) the quality of a received call setup message, CSM; b) the time delay $T_{del}$; and c) also randomly generates a clock offset $N_{camoffset}$ of the clock 156 of the RAP station RAP1.

The processor means 172 includes functional means for implementing the inventive method, such as among other things means 174 for blocking the receipt of signals and a clock 175 which keeps check on the time, these functional means being shown in the Figure. The functional means 174, 175 are connected to a bus which is controlled by the processor means 172.

The signalling procedure employed in the preceding example will now be described in more detail with reference to FIGS. 2 and 3. With the intention of simplifying the example, only two RAP stations RAP1 and RAP2 have been included in FIG. 2 as distinct from the above description which also included RAP stations RAP3, RAP4 and RAP5. The RAP stations RAP1 and RAP2 form interfaces against the permanent network 10 via the switching centre SW1, as before described. The time is referenced t in FIG. 2.

It is assumed that the mobile station A1 and the RAP stations RAP1 and RAP2 are in their idle modes, I, in the initial stage.

Figure 3:
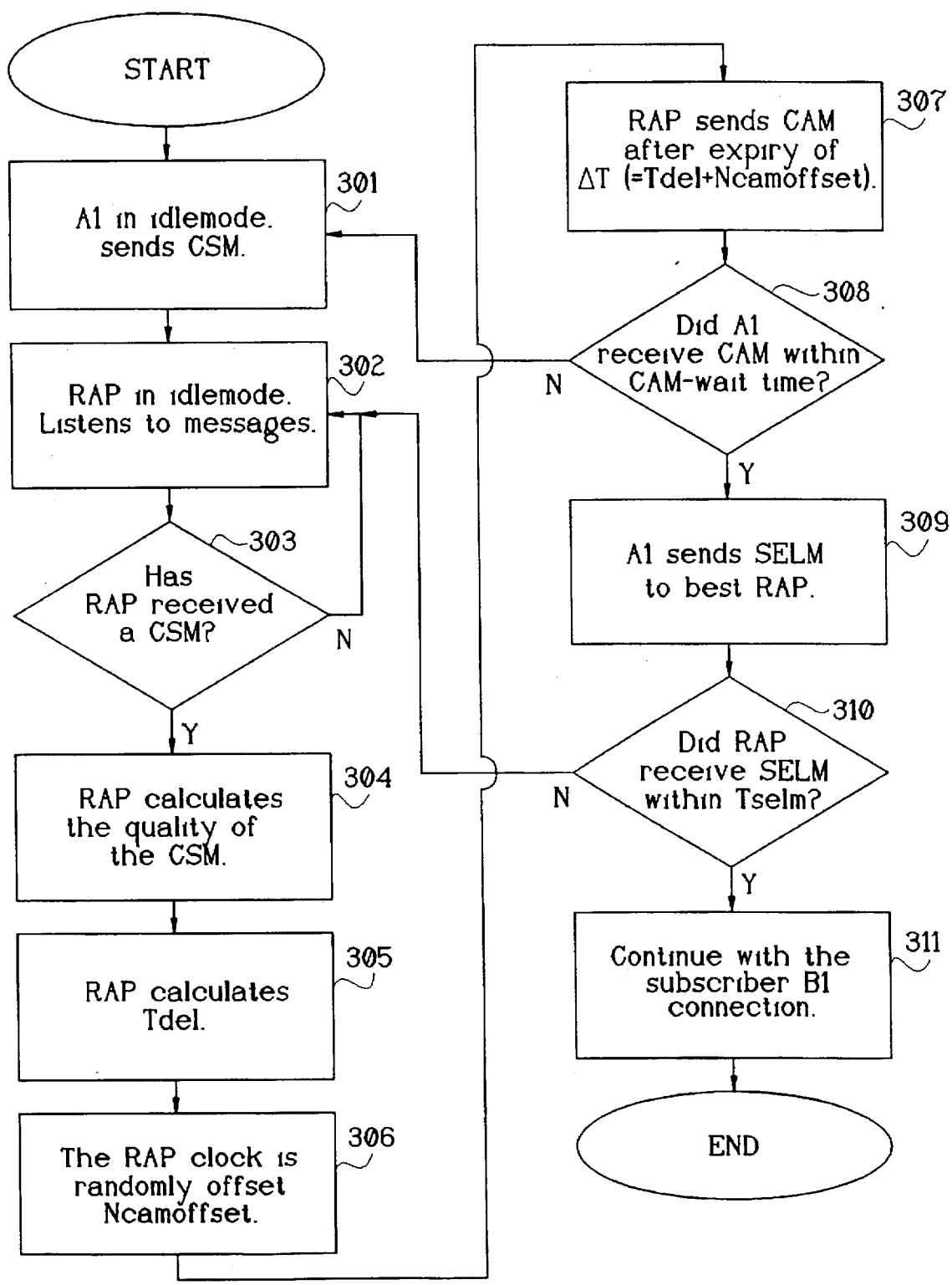
FIG. 3 is a flowchart illustrating the manner in which a calling mobile station A1 sets up a connection in accordance with the invention.

As assumed in the foregoing, the mobile station A1 wishes to establish a connection with the subscriber B1, wherewith the mobile station A1 sends an encoded and encrypted call setup message CSM in step 301 of FIG. 3. The mobile station A1 then switches to its original idle mode A in order to be able to receive reponse messages or call acknowledge messages CAM sent from those RAP stations that have received a CSM. If the mobile station A1 does not receive a call acknowledge message from any of the RAP stations within a given waiting period, designated CAM-wait time, step 308 in FIG. 1, the mobile station A1 aborts its attempt to setup a connection and sends a new CSM on the hop sequence, in accordance with step 301 in FIG. 3. Alternatively, the mobile station A1 can assign this transmission of a new CSM to the Operator of the mobile station A1.

Each of the RAP stations that lie within range of the mobile station A1 and which are not already occupied with a connection to another mobile station will receive the call setup message CSM, see also FIG. 3, step 302 and step 303, and calculates the value of the message signal quality. As assumed in the foregoing and shown in FIG. 2, the RAP stations RAP1 and RAP2 receive the call setup message and calculate a message quality value, see also FIG. 3, step 304. As before mentioned, the message quality value can be calculated in several ways. The RAP stations RAP1 and RAP2 return to their idle mode I after having received the call setup message CSM.

The RAP stations RAP1 and RAP2 then calculate a value of the CAM-delay $\Delta T$, which includes a time delay $T_{del}$, step 305 in FIG. 3, and a clock offset $N_{camoffset}$, step 306 in FIG. 3.

According to the invention, this CAM-delay $\Delta T$ is used to ensure that the mobile station A1 will not receive more call acknowledge messages simultaneously from different RAP stations, and that the call acknowledge message received in the mobile station A1 is sent from the best RAP station, wherein the mobile station A1 is connected to the best RAP station.

The RAP stations wait out the CAM-delay $\Delta T$, i.e. the time delay $T_{del}$ and the clock offset $N_{camoffset}$ before sending the response signal (CAM in FIG. 2) to the mobile station A1, see step 307 in FIG. 3.

The time delay $T_{del}$ is a time space that is corresponded by a full number of idle cycles of the hop sequence. The calculated message quality values are continuous and are placed in different intervals extending from "very good" to "very poor" in accordance with the Table below. The time delay $T_{del}$ is obtained with a starting point from the interval in which the calculated value of the message quality has been placed, wherein a very good message quality value gives a short time delay $T_{del}$ and vice versa. It will be understood that more intervals than those shown in the Table may be used.

Consequently, a RAP station that obtains a call setup message of good quality will obtain a short time delay $T_{del}$ and therewith quickly transmit the call acknowledge message CAM. The RAP stations send their respective call acknowledge messages separated by a full number of idle cycles when they calculate message quality values that are placed in different intervals, as evident from the following Table:

| Quality of received CSM | Time delay Tdel of transmitted CAM |
| --- | --- |
| Very good | 0 idle cycles |
| Good | 1 idle cycle |
| Average | 2 idle cycles |
| Poor | 3 idle cycles |
| Very poor | 4 idle cycles |

When two or more RAP stations calculate message quality values that are placed in the same interval, i.e. they obtain the same time delay $T_{del}$, the clock offset $N_{camoffset}$ is used to ensure that the RAP stations will not send call acknowledge messages CAM back to the mobile station A1 at mutually the same time.

The clock offset $N_{camoffset}$ in the RAP station is achieved by randomly offsetting the clock of respective radio stations by a number of hops in the hop sequence. It will be noted that the clock offset may consist of a number of hops forwards or backwards in the hop sequence. The value of the $N_{camoffset}$ may be generated with the aid of a random generator in the RAP station, for instance. The clock offset $N_{camoffset}$ must be smaller than $N_{offset}$, since those mobile stations that are in their idle mode I are only able to receive one signal from another station if the clock is offset by a maximum of $N_{offset}$ hops. As described above, $N_{offset}$ is the number of hops to which a radio station in an idle mode I listens in the hop sequence before and after the frequency hop to which said radio station shall actually listen in accordance with its idle cycle.

Figure 2:
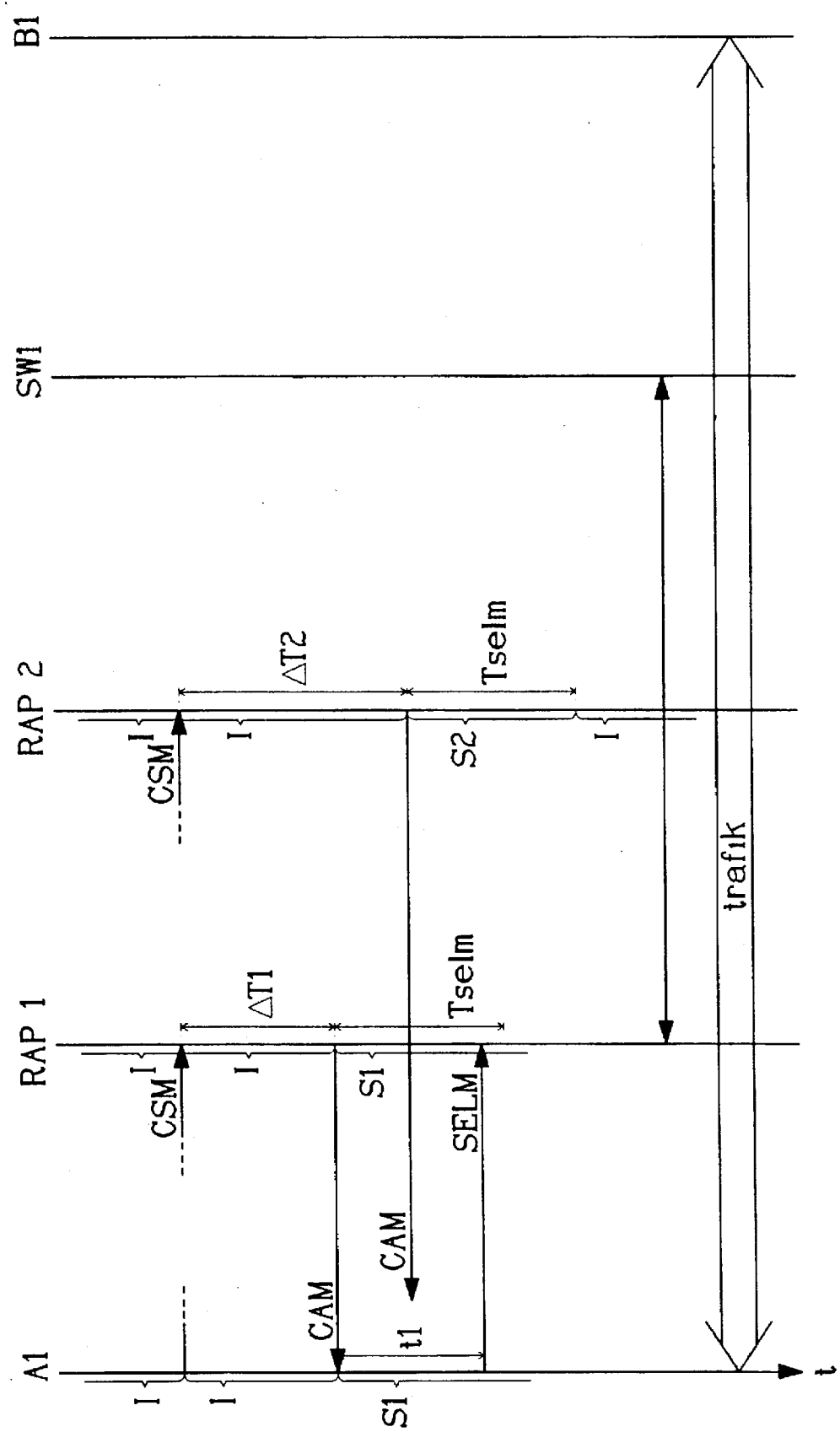
FIG. 2 is a schematic signalling diagram which illustrates signalling according to the invention when a calling mobile station A1 automatically sets up a connection with a called subscriber B1 via the best available RAP station.

As before mentioned, it is assumed that the RAP station RAP1 calculates a value of the CAM-delay $\Delta T1$ that is smaller than the value calculated by the RAP station RAP2 with regard to the CAM-delay $\Delta T2$, as will also be evident from FIG. 2 ($\Delta T1 < \Delta T2$). The RAP station RAP1 will therewith send its call acknowledge message CAM to the mobile Station A1 prior to the RAP station RAP2.

When the RAP station RAP1 has sent its call acknowledge message CAM, which includes inter alia the identity number (RAP1-id) of the RAP station RAP1, to the mobile station A1, the RAP station RAP1 switches to a call direction change mode S1 for a given waiting time, $T_{selm}$ seconds, see step 310 in FIG. 3. The value of the waiting time $T_{selm}$ is greater than the process time t1, said process time t1 being the maximum time taken for the mobile station A1 to process and treat a message from the time at which the message was received.

As described above, the mobile station A1 receives the first obtained call acknowledge message CAM sent from the best RAP station RAP1. The mobile station A1 does not then wish to receive more call acknowledge messages from other RAP stations and switches to a CDC-mode. This CDC-mode is the same CDC-mode as the CDC-mode of the RAP station that sent the received call acknowledge message CAM, since the clock of the mobile station A1 and the clock of the best RAP station are mutually synchronized when the call acknowledge message CAM is sent to the mobile station A1. As evident from FIG. 2, the mobile station A1 receives the call acknowledge message CAM sent from the RAP station RAP1 and then switches to its CDC-mode S1; see step 308 in FIG. 3. The mobile station A1 is unable to receive other signals when in its CDC-mode S1, as described above.

The mobile station A1 then sends the select message SELM in its CDC-mode S1. The select message SELM includes inter alia the B1 number and the identity number of the RAP station RAP1; see step 309 in FIG. 3.

The RAP station RAP1 receives the select message SELM sent from the mobile station A1 and identifies its identity number RAP1-id in the select message SELM, see step 310 in FIG. 3, wherewith the RAP station RAP1 is connected to the switching centre SW1 in the permanent network 10 and then to the subscriber B1 in a known manner; see step 311 in FIG. 3.

The RAP station RAP2 will send its call acknowledge message CAM at a later time than the RAP station RAP1. As before mentioned, the call acknowledge message CAM sent by the RAP station RAP2 will include inter alia the identity number (RAP2-id) of the RAP station RAP2. The RAP station RAP2 then switches to a CDC-mode S2 for a given waiting time, $T_{selm}$ seconds; see step 310 in FIG. 3.

Since the RAP station RAP2 does not receive a select message SELM from the mobile station A1, the RAP station RAP2 will return to its original idle mode I after a given waiting time $T_{selm}$ seconds has lapsed; see steps 302 and 310 respectively in FIG. 3. The RAP station RAP2 is now able to receive call setup messages CSM and is available for setting up other desired connections.

FIG. 3 is a flowchart which illustrates the aforedescribed method schematically. The method commences with step 301 in which the calling mobile station A1 sends a call setup message CSM to surrounding available RAP stations which are situated within the range covered by the mobile station A1 and which are not already occupied by a connection with another mobile station.

The mobile station A1 then switches to its original idle mode I in order to be able to receive call acknowledge messages CAM sent by those RAP stations that have received a call setup message CSM. If the mobile station A1 has not received a call acknowledge signal from any RAP station within a given waiting time, CAM-wait time, the attempt made by the mobile station A1 to obtain a connection setup is aborted, step 308, and the mobile station A1 sends a new call setup message CSM in step 301. Alternatively, the transmission of a new call setup message CSM can be assigned to the Operator of the mobile station.

The RAP stations that are in their idle mode I listen to call setup messages CSM in step 302, and if they have received a call setup message CSM, step 303, they calculate a value of the signal quality of this message in step 304. As assumed in the foregoing, the RAP stations RAP1 and RAP2 receive the call setup message CSM and calculate the quality of the signal/message. The RAP stations RAP1 and RAP2 return to their idle mode I when in receipt of the call setup message CSM.

The RAP stations RAP1 and RAP2 then calculate a value of the CAM-delay ΔT, which includes calculating a time delay $T_{del}$ in step 305 and offsetting the clock $N_{camoffset}$ in step 306.

The RAP stations await the CAM-delay ΔT, i.e. the time delay $T_{del}$ and the clock offset $N_{camoffset}$ before sending the call acknowledge message CAM in step 307.

As before mentioned, it is assumed that the RAP station RAP1 calculates a value of the CAM-delay ΔT1 that is smaller than the value calculated by the RAP station RAP2 with respect to the CAM-delay ΔT2. The RAP station RAP1 will therewith send its call acknowledge message CAM to the mobile station A1 earlier than the RAP station RAP2. Subsequent to having sent its call acknowledge message CAM to the mobile station A1 in step 307, this message including inter alia the identity number (RAP1-id) of the RAP station RAP1, the RAP station RAP1 switches to a CDC-mode for a given waiting time, $T_{selm}$ seconds. The value of the waiting time $T_{selm}$ is greater than the aforedescribed process time t1 in the mobile station A1.

The mobile station A1 receives the first obtained call acknowledge message CAM, this message being sent from the best RAP station RAP1 as described above. The mobile station A1 does not then wish to receive more call acknowledge messages from other RAP stations and switches to a CDC-mode S1 as described in the foregoing. The mobile station A1 is unable to receive other signals when in its CDC-mode S1.

The mobile station A1 then sends the select message SELM in step 309 while in its CDC-mode S1. The select message SELM includes the B1 number and the identity number RAP1-id of the RAP station RAP1, among other things.

The RAP station RAP1 receives the select message sent from the mobile station A1 in step 310 and identifies its identity number RAP1-id in the select message SELM, wherewith the RAP station RAP1 is connected to the switching centre SW1 in the permanent network 10 and then to the subscriber B1 in step 311, in a known manner.

The RAP station RAP2 will send its call acknowledge message CAM at a later time than the RAP station RAP1 in step 307. The RAP station RAP2 then switches to a CDC-mode S2 for a given waiting time, $T_{selm}$ seconds, in step 310.

Because the RAP station RAP2 does not receive a select message from the mobile station A1, the RAP station RAP2 will return to its original idle position I in step 302 after the waiting time $T_{selm}$ seconds has lapsed in step 310. The RAP station RAP2 is therewith able to receive call setup messages CSM and is available for other desired connection setups.

As described in the foregoing, the RAP stations return to their idle modes I subsequent to having received a call setup message CSM. They may alternatively switch to a blocked receiving mode when unable to receive external signals.

The mobile station A1 is in its CDC-mode S1 when sending the select message SELM in the aforedescribed example. Alternatively, the mobile station A1 may be in its idle mode I when sending the select message SELM. One advantage with this is that a message which is sent during the idle time I is less sensitive to interference than a message that is sent in the CDC-mode. Although this will result in a slightly longer signalling time, the extra time involved can be ignored in the aforedescribed example.

The RAP stations in the aforedescribed example switch to the CDC-mode during a waiting time $T_{selm}$ after having sent their respective call acknowledge messages CAM. If, after having sent their respect-ire call acknowledge messages CAM, the RAP stations instead switch to either their idle mode I or to a blocked mode in which they are only able to receive select messages SELM, the select message SELM sent from the mobile station A1 can be used as a release signal. Those RAP stations that are unable to find their own identity numbers in a received select message, SELM will return to their original idle mode I. These stations are then able to receive call setup messages CSM and thus become available for other desired connection setups. There is a slight chance that the RAP stations will be able to receive other signals in the idle mode before having received a select message SELM. This risk can be discounted in the aforedescribed example, however, because of the short process time t1 of the mobile station A1, said mobile station A1 quickly transmitting the select message SELM on the hop sequence.

It will be understood that the clock offset $N_{camoffset}$ is only necessary in those instances when a collision must be avoided in the mobile station A1 between several call acknowledge messages CAM that are sent simultaneously from different RAP stations.

In the aforedescribed embodiment, a clock offset $N_{camoffset}$ always occurs when calculating a value of the CAM-delay ΔT, although the clock offset $N_{camoffset}$ can be excluded when the RAP stations obtain different time delay values, since there is no longer any risk of the mobile station A1 being able to receive more call acknowledge messages CAM. In these cases, the CAM-delay ΔT includes solely the time delay $T_{del}$. For instance, the clock offset $N_{camoffset}$ can be omitted when a radio network includes only a few RAP stations, wherein the risk of collision in the mobile station A1 between call acknowledge messages CAM sent simultaneously from several RAP stations is considered to be small.

When several RAP stations calculate message quality values that lie within the same best interval, wherewith the RAP stations obtain the same value of the time delay $T_{del}$, all of these RAP stations can be considered qualified to constitute the best RAP station. Random selection will decide which RAP station is chosen to be the best RAP station and therewith the first to transmit its call acknowledge message CAM. This takes place in dependence on the clock offset $N_{camoffset}$ obtained by the RAP station. One embodiment of the invention can be achieved by weighting the value of the clock offset $N_{camoffset}$ in respective RAP stations, with the aid of the calculated message quality values. A message quality value that falls in the upper part of each interval in the above Table is weighted so that it will be highly probable that the clock offset $N_{camoffset}$ will be negative, i.e. so that the CAM-delay $\Delta T$ will be shorter, whereas a message quality value that falls in the lower part of each interval is weighted so that it will be highly probable that the clock offset $N_{camoffset}$ will be positive, i.e. so that the CAM-delay $\Delta T$ will be longer. When two or more RAP stations have calculated message quality values that fall in the same interval in the above Table, these RAP stations will also obtain the same time delay $T_{del}$ on a full number of cycles of their call acknowledge messages CAM. The RAP station that calculated the best message quality value will in all probability obtain a negative clock offset $N_{camoffset}$ on its call acknowledge message CAM after weighting said message quality, this call acknowledge message being the first to be transmitted.

When a calling subscriber A3 in the permanent network 10 according to FIG. 1a wishes to establish a connection with a mobile station B3, the invention can be applied in the following manner: The mobile station B3 sends at regular intervals to surrounding available RAP stations a separate call setup message CSM which includes a special character, e.g. a prefix. The call setup message CSM is sent manually by the mobile station B3, although transmission of said message may also be implemented automatically at regular intervals. The signal quality of the call setup message CSM is calculated by those RAP stations that have received the message and these stations then calculate a CAM-delay value as described above. The RAP stations send a call acknowledge message CAM after the CAM-delay $\Delta T$ has expired and the mobile station B3 receives the first obtained call acknowledge message CAM and then switches to a CDC-mode, as described above. The mobile station B3 then sends a select message SELM to the RAP station from which the mobile station B3 has received the first call acknowledge message CAM. The identity of the mobile station B3 is stored in the switching centre to which the selected RAP station is connected, or, alternatively, the identity of said mobile station can be stored in the selected RAP station. A so-called re-affiliation is achieved in this way with the aid of the invention. When the A3 subscriber then wishes to establish a connection with the mobile station B3, there is used the RAP station in which the identity of the mobile station B3 is stored and the RAP station then continues to setup the connection.

The RAP stations in the aforedescribed embodiment need not be limited to handling only one radio connection at a time, but may handle several different radio connections simultaneously.

When the radio network includes only one RAP station RAP1, all signalling procedures are undertaken before the RAP station RAP1 connects the mobile station A1 to a desired subscriber. Alternatively, this delay can be avoided by inserting in the RAP station RAP1 or by inserting in the mobile station A1 a parameter which discloses this circumstance and the connection between the mobile station A1 and the RAP station RAP1 continues immediately in a known manner.

The invention cannot be applied when the mobile station A1 in the radio network RN11 wishes to setup a connection via a RAP station RAP1 that has been especially pointed out. In this case, the mobile station A1 sends on the hop sequence a call setup message CSM which includes the identity number of the RAP station RAP1 concerned. The RAP station RAP1 receives the call setup message CSM sent from the mobile station A1 and sends a call acknowledge message CAM to the mobile station A1, which, in turn, sends a select message SELM. When the RAP station RAP1 has received the select message SELM sent from the mobile station A1, the RAP station RAP1 self-connects with the switching centre SW1 in the permanent network 10 and then to the subscriber B1 in a known manner. It is also possible that the RAP station RAP1, after receiving the call setup message sent from the mobile station A1, self-connects directly to the switching centre SW1 in the permanent network 10 and then to the subscriber B1 in a known manner.

It will be understood that the invention can be applied irrespective of the type of information to be exchanged between the calling and the called subscribers. Thus, the information may be speech information, data information, picture information and so on.

I claim:

1. A method for setting up a connection in a communications network between a mobile station (A1) and a radio station (RAP1), wherein the communications network includes at least one radio network (RN11, RN12) having mobile stations (A1, A2, B2, B3) and radio stations (RAP1–RAP6) which form an interface to a permanent network (10) in the communications network, wherein the method comprises the steps of:

sending a call setup message (CSM) from the mobile station (A1) to the radio stations (RAP1, RAP2, RAP3, RAP4, RAP5);

receiving the call setup message (CSM) in the available radio stations (RAP1, RAP2, RAP3);

generating a response signal delay ($\Delta T$) in said available radio stations (RAP1, RAP2, RAP3), wherein a best radio station (RAP1) of said radio stations generates the shortest response signal delay ($\Delta T$);

sending a response signal (CAM) from said available radio stations (RAP1, RAP2, RAP3) after the expiry of a corresponding response signal delay ($\Delta T$), Wherein the best radio station (RAP1) is the first station to send its response signal (CAM);

receiving in the mobile station (A1) the response signal (CAM) sent by said best radio station (RAP1)

blocking the receipt of later transmitted response signals (CAM) in the mobile station (A1);

sending a select message (SELM) from the mobile station (A1); and detecting the select message (SELM) sent by the mobile station (A1) in the best radio station (RAP1), wherewith the connection is setup between the mobile station (A1) and the best radio station (RAP1).

2. A method according to claim 1, comprising generating a respective quality value of the connections between the mobile station (A1) and said available stations (RAP1, RAP2, RAP3) such as to obtain a response signal delay ($\Delta T$).

3. A method according to claim 2, wherein generation of the quality value in said available radio stations (RAP1, RAP2, RAP3) comprises generating a signal quality of the call setup message (CSM) in said available radio stations (RAP1, RAP2, RAP3).

4. A method according to claim 3, wherein generation of the signal quality includes measuring the average signal strength of the call setup message (CSM).

5. A method according to claim 3, wherein generation of the signal quality includes determining the average interference on the call setup message (CSM).

6. A method according to claim 3, wherein generation of the signal quality includes determining the number of bits that cannot be retained when decoding information in the call setup message (CSM).

7. A method according to claim 3, wherein generation of the response signal delay ($\Delta T$) includes generating a time delay ($T_{del}$) in said available radio stations (RAP1, RAP2, RAP3), wherein the best radio station (RAP1) generates the shortest time delay ($T_{del}$).

8. A method according to claim 7, wherein the time delay ($T_{del}$) is inversely proportional to the generated value of the signal quality of the call setup message (CSM) in said available radio stations (RAP1, RAP2, RAP3).

9. A method according to claim 8, wherein the time delay ($T_{del}$) includes a full number of idle cycles in a sequence of frequency hops used in the communications network.

10. A method according to claim 9, wherein the response signal (CAM) includes the identity number (RAP-id) of respective corresponding radio stations (RAP1, RAP2, RAP3); and in that the select message (SELM) includes the subscriber identity number (B1 number) and the identity number (RAP1-id) of the best radio station (RAP1).

11. A method according to claim 3, wherein generation of the response signal delay ($\Delta T$) includes a respective clock offset ($N_{camoffset}$) of the clocks (156) of said available radio stations (RAP1, RAP2, RAP3).

12. A method according to claim 11, wherein the clock offset ($N_{camoffset}$) in said available radio stations (RAP1, RAP2, RAP3) takes place randomly a number of hops in the frequency hop sequence.

13. A method according to claim 1, wherein after receiving the response signal (CAM) from the best radio station (RAP1), the mobile station (A1) switches to a receiving mode (S1) in which it is blocked against the receipt of other response signals.

14. A method according to claim 13, wherein the blocked receiving mode (S1) is a CDC-mode.

15. A method according to claim 13, wherein the mobile station (A1) is in an idle mode (I) prior to sending the call setup message (CSM); in that the mobile station (A1) remains in its idle mode (I) after having sent the call setup message (CSM); in that said available radio stations (RAP1, RAP2, RAP3, RAP5) are originally in an idle mode (I) prior to receiving a call setup message (CSM); in that said available radio stations (RAP1, RAP2, RAP3) remain in their respective idle modes (I) after receiving a call setup message (CSM); and in that said available radio stations (RAP1, RAP2, RAP3) switch to a reception mode (CDC-mode) in which they are blocked against the receipt of other signals, subsequent to sending the response signal (CAM).

16. A method according to claim 15, wherein the blocked reception mode (S1) to which the best radio station (RAP1) switches after sending its response signal (CAM) is the same as the blocked reception mode (S1) to which the mobile station (A1) switches after receiving the response signal (CAM) from the best radio station (RAP1).

17. A method according to claim 1, wherein the communications network includes at least one permanent network (10) having permanent subscribers (A3, B1) that are connected to switching centres (SW1, SW3), wherein detection of the select message (SELM) in the best radio station (RAP1) includes the steps of:

receiving the select message (SELM) in the best radio station (RAP1);

identifying the identity number (RAP1-id) of the best radio station (RAP1) in the select message (SELM); and continuing the connection setup between the mobile station (A1) and the best radio station (RAP1) to a permanent subscriber (B1) or to a mobile subscriber (B3).

18. A method according to claim 17, wherein the mobile station (A1) aborts the procedure when the mobile station (A1) does not receive a response message (CAM) from any radio station (RAP1, RAP2, RAP3) within a stipulated waiting time (CAM wait time); and in that said available radio stations (RAP1, RAP2, RAP3) abort the procedure when they do not receive a select message (SELM) from the mobile station (A1) within a stipulated waiting time ($T_{selm}$).

19. An arrangement for setting up a connection between a mobile station (A1) and a best radio station (RAP1) in a communications network which includes at least one radio network (RN11, RN12) having mobile stations (A1, A2, B2, B3) and radio stations (RAP1–RAP6) which form an interface between mobile and permanent networks, wherein the arrangement includes:

means (170) for sending a call setup message (CSM) from the mobile station (A1) to surrounding radio stations (RAP1, RAP2, RAP3, RAP4, RAP5);

means (151) for receiving the call setup message (CSM) in available radio stations (RAP1, RAP2, RAP3);

means (154) for generating a response signal delay ($\Delta T$) in said available radio stations (RAP1, RAP2, RAP3), wherein a best radio station (RAP1) generates the shortest response signal delay ($\Delta T$);

means (150) for sending a response signal (CAM) from said available radio stations (RAP1, RAP2, RAP3) after expiry of a corresponding response signal delay ($\Delta T$), wherein the best radio station (RAP1) sends its response signal (CAM) first;

means (171) in the mobile station (A1) for receiving the response signal (CAM) from the best radio station (RAP1);

means (174) for blocking the reception of later transmitted response signals (CAM) in the mobile station (A1);

means (170) for sending a select message (SELM) from the mobile station (A1); and respective means (151, 155) in the best radio station (RAP1) for receiving and identifying the select message (SELM) sent from the mobile station (A1), wherewith the connection is established between the mobile station (A1) and the best radio station (RAP1).

20. An arrangement according to claim 19, wherein the response signal delay generating means (154) generates a respective quality value of the connections between the mobile station (A1) and the available radio stations (RAP1, RAP2, RAP3).

21. An arrangement according to claim 20, wherein said means (154) for generating the response signal delay ($\Delta T$) generates the respective quality values by generating a signal quality of the call setup message (CSM) in said available radio stations (RAP1, RAP2, RAP3).

22. An arrangement according to claim 21, wherein the means (154) for generating the response signal delay ($\Delta T$) in said available radio stations (RAP1, RAP2, RAP3) generates a time delay ($T_{del}$), wherein the best radio station (RAP1) generates the shortest time delay ($T_{del}$) and wherein the time delay ($T_{del}$) is inversely proportional to the generated quality value of the call setup message (CSM) in said available radio stations (RAP1, RAP2, RAP3).

23. An arrangement according to claim 21, wherein said means (154) for generating the response signal delay ($\Delta T$) randomly generates a respective clock offset ($N_{camoffset}$) of the clocks (156) of said available radio stations (RAP1, RAP2, RAP3).

* * * * *